United States Patent
Tanaka et al.

[15] 3,642,575
[45] Feb. 15, 1972

[54] PROCESS FOR PRODUCING SUGARS BY FERMENTATION

[72] Inventors: Katsunobu Tanaka; Takeo Suzuki, both of Machida-shi, Japan

[73] Assignee: Kyowa Hakko Kogyo Co., Ltd., Tokyo, Japan

[22] Filed: June 17, 1968

[21] Appl. No.: 737,384

Related U.S. Application Data

[63] Continuation of Ser. No. 610,745, Jan. 23, 1967, abandoned.

[52] U.S. Cl. ...................................................195/28 R
[51] Int. Cl. ....................................................C12d 13/04
[58] Field of Search..........................................195/3, 3 H, 28

[56] References Cited

UNITED STATES PATENTS

| | | | |
|---|---|---|---|
| 2,697,061 | 12/1954 | Harris et al. | 195/3 H |
| 3,057,784 | 10/1962 | Davis et al. | 195/3 H |
| 3,169,099 | 2/1965 | Davis | 195/3 H |
| 3,264,196 | 8/1966 | Filosa | 195/3 H |
| 3,320,136 | 5/1967 | Zajic | 195/28 |

*Primary Examiner*—Alvin E. Tanenholtz
*Attorney*—Craig, Antonelli and Hill

[57] ABSTRACT

The present disclosure relates to a fermentation process for the production of sugars. Hydrocarbons such as n-paraffins are used as the main source of carbon and micro-organisms capable of assimilating hydrocarbons are cultured therewith under aerobic conditions in an aqueous nutrient medium to produce the sugars. Typical sugars produced are glucose, mannose, galactose, arabinose, rhamnose, fructose, ribose and the like as well as the polymers thereof.

13 Claims, No Drawings

PROCESS FOR PRODUCING SUGARS BY FERMENTATION

CROSS-REFERENCE TO RELATED APPLICATION

This application is a continuation of copending application Ser. No. 610,745, filed on Jan. 23, 1967 now abandoned.

This invention relates to the art of fermentation and, more particularly, to a process for producing sugars by fermentation.

It has been known in the prior art that certain micro-organisms grow in culture media containing methane, benzene, kerosene and the like as the sole carbon source. Moreover, it has recently been reported that amino acids, organic acids, and the like are accumulated by some micro-organisms in culture media containing hydrocarbons as the starting material. However, the production of sugars from hydrocarbons as the carbon source by a process of fermentation has not as yet been found.

Generally, many micro-organisms grow in a culture medium containing at least one kind of sugar as the carbon source. Accordingly, the present invention has been accomplished by the present inventors after investigations on the industrial scale production of sugars, such as glucose, mannose, galactose, arabinose, rhamnose, fructose, ribose and their polymers from inexpensive starting material hydrocarbons. In particular, the present invention results from research concerning the fact that some of the micro-organisms which have an assimilatory capacity for hydrocarbons, i.e., they selectively assimilate hydrocarbons rather than sugars, are capable of producing sugars.

Accordingly, one of the objects of the present invention is to provide a fermentation process for the production of sugars.

Another object of the present invention is to provide a process for producing sugars by fermentation which may be carried out in an efficacious and simple manner.

A further object of the invention is to provide a process for producing sugars by fermentation which may be carried out advantageously on an industrial scale with the use of inexpensive starting materials to give a high yield of product.

These and other objects and advantages of the present invention will become apparent to those skilled in the art from a consideration of the following specification and claims.

In accordance with the present invention, it has been found that sugars may be produced by fermentation by culturing under aerobic conditions micro-organisms which have the capacity to assimilate hydrocarbons in a culture medium containing at least one kind of hydrocarbon as the main carbon source. The accumulated sugars may then be recovered from the culture medium.

Various kinds of micro-organisms may be employed to accumulate sugars in a culture medium which contains at least one kind of hydrocarbon as the main carbon source. As mentioned above, these micro-organisms have the ability to grow by the assimilation of hydrocarbons. Exemplary thereof are the following:

Arthrobacter paraffineus
Arthrobacter roseoparaffinus
Brevibacterium ketoglutamicum
Micrococcus paraffinolyticus
Bacterium aliphaticum
Corynebacterium hydrocarboclastus
Pseudomonas aeruginosa
Mycobacterium lacticola
Candida lipolytica
Aspergillus oryzae Thus, it can be seen that micro-organisms having the ability to produce sugars from hydrocarbons as the carbon source are widespread both as to genus and family type.

In the present invention, n-paraffins having from 6 to 25 carbon atoms or various kinds of hydrocarbon fractions containing n-paraffins are suitable as the carbon source to be employed. However, it is to be understood that any hydrocarbon which can be assimilated by the particular micro-organism employed may be used.

The other details of culturing in order to produce the desired sugars by fermentation are those conventionally employed in the art. Thus, either a synthetic culture medium or a natural nutrient medium is suitable in the present invention as long as it contains the essential nutrients for the growth of the strain employed, in addition to at least one kind of hydrocarbon as the main carbon source. These nutrients are well known in the art and include substances, in addition to the carbon source, such as a nitrogen source, inorganic compounds and the like which are utilized by the micro-organism employed in appropriate amounts. Thus, as a nitrogen source, various kinds of inorganic or organic salts or compounds, such as urea of ammonium salts such as ammonium chloride, ammonium sulfate, ammonium nitrate, ammonium phosphate, etc., or one or more than one amino acid mixed in combination, or natural substances containing nitrogen such as corn steep liquor, yeast extract, meat extract, peptone, fish meal, casein hydrolysates, casamino acid, fish solubles, rice bran extract etc., may be employed. These substances may be used either singly or in combinations of two or more. Inorganic compounds which may be added to the culture medium include magnesium sulfate, sodium phosphate, potassium dihydrogen phosphate, potassium monohydrogen phosphate, ferrous sulfate or other iron salts, manganese chloride, calcium chloride, etc. Moreover, if a particular growth factor is necessary for the growth of the particular micro-organism employed, it should also be added to the culture medium.

Fermentation or culturing is carried out by inoculating the micro-organism employed into an aqueous nutrient medium and then incubating the same under aerobic conditions at 25° to 40° C. During culturing, the pH is adjusted to between 4 and 10 (preferably 6–9) by the addition of, for example, a urea solution, ammonia water or ammonium carbonate solution thereto. The fermentation is usually completed in from 3 to 5 days, substantially at the time when the measurement value of the total amount of sugars shows a maximum.

After the completion of fermentation, the sugars may then be separated from the fermentation broth. One way of doing this is to filtrate the fermentation broth and then to pass the filtrate through a cation exchange resin column in order to adsorb and remove all of the amino acids and cations. The effluent is then passed through an anion exchange resin column to remove organic acids and other anionic substances. The effluent thus obtained is then concentrated under reduced pressure; in some cases, it is concentrated after decolorization thereof.

In this manner, or in any other suitable manner, the sugars are recovered from the fermentation broth. Polymers of the sugars present are hydrolyzed before or after passing them through the column and then the above-described procedures are employed.

The following examples are given merely as illustrative of the present invention and are not to be considered as limiting. Unless otherwise noted, the percentages therein are by weight. Again, it is reiterated that all micro-organisms which have the hydrocarbon assimilatory properties noted above, as well as mutant strains thereof, are suitable to be employed, and the present invention is not to be limited to those micro-organisms specifically shown.

EXAMPLE I

Arthrobacter paraffineus, ATCC15591, is cultured in a seed culture medium consisting of 1.0 percent of meat extract 1.0 percent of peptone, and 0.5 percent of NaCl for 24 hours with aerobic shaking. The pH thereof is adjusted to 7.2 before sterilization.

The resultant seed medium is then inoculated into 3 liters of a culture medium contained in a 5 liter jar fermentor in the ratio of 10 percent (by volume). The culture medium has the following composition:

0.2 % $K_2HPO_4$ 0.1 % MgSO$_4$·7H$_2$O
0.002 % MnSO$_4$·4H$_2$O
0.002% FeSO$_4$·7H$_2$O
0.001 % ZnSO$_4$·7H$_2$O
1.0 % NH$_4$NO$_3$
0.02 % cornsteep liquor Culturing is carried out at 30° C. with an agitation of 600 r.p.m. and with aeration at the rate of 1 liter per minute of sterile air for 80 hours. At the beginning of culturing, 100 ml. of a C$_{11}$–C$_{18}$ n-paraffin mixture is added to the medium. Subsequently, a further 100 ml. of the same hydrocarbons is added every 24 hours. The pH of the culture medium is adjusted to 6.8–7.5 with ammonia water during culturing.

At the completion of fermentation, the amount of sugar produced is 8 grams per liter (as total sugar).

The sugar is then recovered from the fermentation broth. First, 2.5 liters of the fermentation broth is filtered with use of Celite 545 (manufactured by Takeda Pharmaceutical Co., Ltd.) as the filter aid in order to remove the cells therefrom. The resulting filtrate is passed through 2 liters of the cation exchange resin column (Diaion SK No.1A H type, manufactured by Mitsubishi Kasei Co., Ltd.) and washed with water. 3 liters of effluent is obtained thereby. The effluent is then passed through 2 liters of the anion exchange resin column (Diaion SA 200, OH type, manufactured by Mitsubishi Kasei Co., Ltd.) The finally obtained 4.3 liters of effluent is concentrated to 100 ml. under reduced pressure. A hydrochloric acid-methanol solution is then added thereto in order to effect precipitation of the sugars. The solution was then left in a cold room. The thus separated precipitates are filtered and dried. As a result, 12 grams of a white glucose polymer is recovered.

EXAMPLE II

*Arthrobacter roseoparaffinus*, ATCC15584, is cultured in a culture medium containing kerosene as the carbon source in a 5 liter jar fermentor in the same manner as described in Example I. After 72 hours of culturing, the fermentation broth is treated with 1 N-sulfuric acid at 100°C. for one-half hour. The sugars are then recovered from the hydrolyzate in accordance with the procedure described in Example I. As a result, 5.3 grams of glucose and 1.3 grams of sucrose (calculated as glucose) are obtained from 2 liters of fermentation liquor.

EXAMPLE III

*Brevibacterium ketoglutamicum*, ATCC15587, is cultured in the same manner and in the same culture medium as described in Example I, except that n-paraffins containing C$_{15}$–C$_{20}$ fractions are employed as the carbon source. The amount of sugars produced is 3.3 g./l. (total sugar) after 76 hours of culturing.

The fermentation liquor is hydrolyzed with sulfuric acid as described in Example II. Subsequently, it is passed through an ion exchange resin. As a result, 4.3 grams of glucose crystals is recovered from 2.5 liters of fermentation liquor.

EXAMPLE IV

*Corynebacterium hydrocarboclastus*, ATCC15592, is cultured in a seed culture medium consisting of 2 percent of sorbitol, 1 percent of peptone, 1 percent of meat extract and 0.5 percent of sodium chloride for 24 hours with aerobic shaking. The resultant seed culture is inoculated into the fermentation medium described below in the ratio of 10 percent (by volume). The fermentation medium employed has the following composition:

10 % kerosene (hydrocarbon source)
0.2 % K$_2$HPO$_4$
0.2 % KH$_2$PO$_4$
0.1 % MgSO$_4$·7H$_2$O
0.005 % MnSO$_4$·4H$_2$O
0.001 % FeSO$_4$·7H·7H$_2$O
2.0 % NH$_4$NO$_3$
0.02 % cornsteep liquor
2γ/l. thiamine The pH of the fermentation medium is adjusted to 7.5 before sterilization. 20 ml. portions of the fermentation medium are poured into Sakaguchi flasks, respectively. Culturing is then carried out with aerobic shaking at 30° C. The pH is adjusted to within 6 to 8 during culturing with a urea solution and an Ammonium carbonate solution.

After 4 days of culturing, the resultant fermentation liquor is passed through the same ion exchange resin as described in Example II. 50 ml. of the effluent is hydrolyzed with 4 percent sulfuric acid and, subsequently, it is chromatographically treated by means of a boric acid type anion exchange resin (Dowex 1×8). As a result, 0.55 gram of glucose, 0.1 gram of xylose, and 0.1 gram of fructose are recovered from 1.3 liters of fermentation liquor.

EXAMPLE V

*Micrococcus paraffinolyticus*, ATCC15582, is cultured in a seed culture medium prepared by adding 5 percent of n-paraffins containing C$_{15}$–C$_{20}$ fractions and 0.1 percent of urea to the seed culture medium described in Example IV. Aerobic shaking thereof is effected for 24 hours.

The resultant seed medium is cultured in the same fermentation medium and in accordance with the same procedure as is described in Example IV. After 4 days of culturing, the fermentation broth is treated as described in Example II. As a result, 0.8 gram of glucose and 0.3 gram of sucrose are recovered from 1.5 liters of culture liquor.

EXAMPLE VI

The same culture as described in Example V is conducted, but with the use of *Pseudomonas aeruginosa*, ATCC 7700. After 120 hours of culturing, 0.73 g./l. of glucose, and 0.42 g./l. of ribose are produced in the fermentation broth.

As noted above, n-paraffins having from 6 to 25 carbon atoms are the preferred hydrocarbon source to be employed in accordance with the process of the present invention. A single n-paraffin or a mixture of more than one of these n-paraffins, or a mixture of one or more than one of these n-paraffins together with another carbon source, such as alcohols, organic acids, or their esters wherein the n-paraffin is the major constituent, may be used.

The invention being thus described it will be obvious that the same may be varied in many ways. Such variations are not to be regarded as a departure from the spirit and scope of the invention, and all such modifications as would be obvious to one skilled in the art are intended to be included herein.

We claim:

1. A process for producing sugars which comprises culturing a micro-organism capable of assimilating hydrocarbons and belonging to a genus selected from the group consisting of *Arthrobacter*, *Brevibacterium*, *Micrococcus*, *Bacterium*, *Corynebacterium*, *Pseudomonas*, *Mycobacterium*, *Candida* and *Aspergillus* under aerobic conditions in an aqueous nutrient medium containing a hydrocarbon or a mixture of hydrocarbons as the main carbon source, accumulating polymers of sugars in the resultant culture liquor, and recovering sugars therefrom.

2. The process of claim 1, wherein said hydrocarbon is selected from the group consisting of n-paraffins having from 6 to 25 carbon atoms.

3. The process of claim 1, wherein said hydrocarbon is kerosene.

4. The process of claim 1, wherein said hydrocarbon is benzene.

5. The process of claim 1, wherein said culturing is carried out at a temperature of from about 25° to 40° C., and a pH of about 4 to 10.

6. The process of claim 1, wherein said hydrocarbon is selected from the group consisting of n-paraffins having from 6 to 25 carbon atoms.

7. The process of claim 1, wherein said micro-organism is *Arthrobacter paraffineus* ATCC 15591.

8. The process of claim 1, wherein said micro-organism is *Arthrobacter roseoparaffinus* ATCC 15584.

9. The process of claim 1, wherein said micro-organism is *Brevibacterium ketoglutamicum* ATCC 15587.

10. The process of claim 1, wherein said micro-organism is *Corynebacterium hydrocarboclastus* ATCC 15592.

11. The process of claim 1, wherein said micro-organism is *Micrococcus paraffinolyticus* ATCC 15582.

12. The process of claim 1, wherein said micro-organism is *Pseudomonas aeruginosa* ATCC 7700.

13. The process of claim 1, wherein said recovery is effected by means of at least one kind of ion exchange resin treatment.

UNITED STATES PATENT OFFICE
CERTIFICATE OF CORRECTION

Patent No. 3,642,575         Dated February 15, 1972

Inventor(s) Katsunobu Tanka et al.

It is certified that error appears in the above-identified patent and that said Letters Patent are hereby corrected as shown below:

On the cover page insert:

-- Foreign Application Priority Data
   January 26, 1966   Japan     4110/66 --.

Signed and Sealed this thirteenth Day of April 1976

[SEAL]

Attest:

RUTH C. MASON
Attesting Officer

C. MARSHALL DANN
Commissioner of Patents and Trademarks